D. CRAIG.
PIPE UNION.
APPLICATION FILED NOV. 5, 1914.
1,225,777.
Patented May 15, 1917.
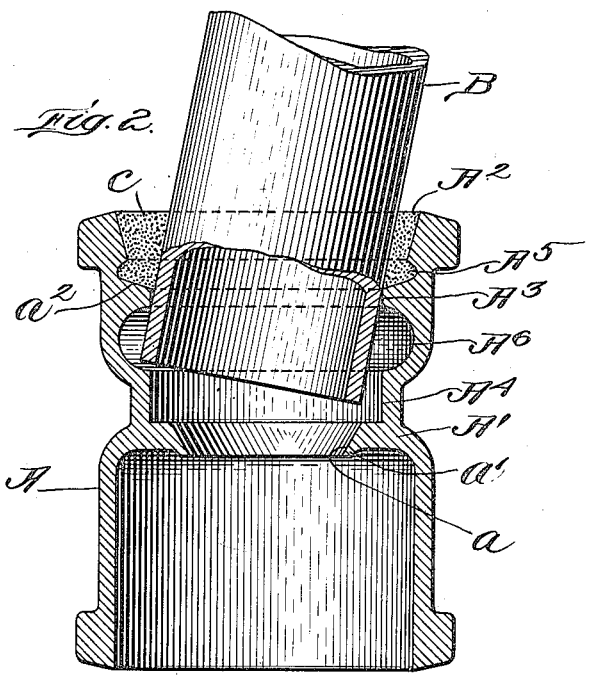
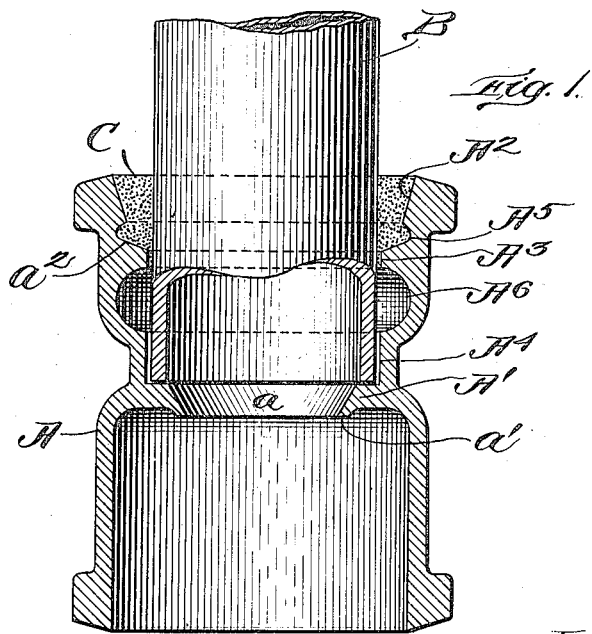
Witnesses:
Josephine H. Ryan
Richard W. Hall
Inventor:
David Craig,
By Potts & Potts
Attys.

UNITED STATES PATENT OFFICE.

DAVID CRAIG, OF PEABODY, MASSACHUSETTS.

PIPE-UNION.

1,225,777. Specification of Letters Patent. Patented May 15, 1917.

Application filed November 5, 1914. Serial No. 870,402.

*To all whom it may concern:*

Be it known that I, DAVID CRAIG, a citizen of the United States, and resident of Peabody, in the county of Essex and State of Massachusetts, have invented new and useful Improvements in Pipe-Unions, of which the following is a specification.

This invention relates to pipe joints or unions, and its principal object is to provide a joint wherein a pipe may be firmly secured by the usual molten lead packing without the use of an additional packing of oakum or the like, such as has heretofore commonly been employed. A further object of the invention is to provide simple and effective means for guiding the pipe to its proper position within the joint, thus insuring a proper alinement and connection between the two. These and other objects and advantages of the invention are hereinafter more particularly pointed out.

In the drawings hereto annexed which illustrate an embodiment of the invention,—

Figure 1 is a central longitudinal section of a pipe union or joint embodying my invention and showing a pipe secured therein in the usual position; and Fig. 2 is a similar view showing a pipe secured within the union in an angular position.

A is a double ended hub open at both ends and provided with a partition A' dividing said hub into two compartments or parts, and upon which the pipe B rests when secured in the usual position within the hub as shown in Fig. 1. Preferably the said partition is located at or about the middle of the hub. It is provided with a central opening $a$ of smaller diameter than the pipe B, said opening having a beveled bore and a downwardly directed lip $a'$.

The mouth of one of the compartments or parts into which the casing is divided, has an outwardly flaring or beveled wall $A^2$, and said part is further provided with a circumferential flange $A^3$ and wall $A^4$, the said wall $A^4$ being located in proximity to the partition A', and the flange $A^3$ in proximity to the beveled wall $A^2$. Between the flange $A^3$ and the beveled wall $A^2$ is a circumferential groove $A^5$, and there is another circumferential groove $A^6$ between the flange $A^3$ and wall $A^4$. Preferably the flange $A^3$ has an inwardly sloping or beveled top face as clearly shown at $a^2$.

When the pipe B is inserted into the hub, the flange $A^3$ and wall $A^4$ center and guide it to its proper position with its end resting against the partition A', as shown in Fig. 1. A suitable packing C, as for example molten lead, is then poured into the hub around the pipe B and tamped down by any suitable tool, thus securely uniting the pipe and hub. It will be understood that the provision of the circumferential groove $A^5$ into which the molten lead flows, prevents disengagement of the packing after the lead has cooled.

The hubs of this general type heretofore provided are of such shape that when the pipe is seated upon the partition or other rest therein, a comparatively wide space is left between the wall of said hub and the pipe, said space extending from the bottom of the pipe to the mouth of the hub. In securing the pipe and the hub, this space is first partially filled with oakum or the like tamped down by suitable tools and the molten lead packing is then poured into the remaining space and in turn tamped down. This construction is disadvantageous not only because of the labor necessarily expended in tamping down the oakum, but also because the said oakum or similar packing soon wears away in service rendering the joint defective. By the use of my invention the packing of oakum or the like is wholly eliminated. The flange $A^3$ and wall $A^4$ give sufficient support to the pipe and prevent its tilting within the hub, and the lead packing C is sufficient to secure the pipe and hub. It will be apparent that as the upper face $a^2$ of the flange $A^3$ slopes inwardly, a blow upon the packing C tends to force said packing, resting upon said face, toward the pipe B and thus aids in firmly securing it in position.

Fig. 2 shows the pipe B secured in angular position within the hub to avoid the necessity of employing an elbow or the like. In securing the pipe in angular position, its end instead of resting upon the partition A' extends into the circumferential groove $A^6$, and the beveled wall $A^2$ not only permits the pipe to be secured within the hub at a wide angle, but also leaves sufficient space between the tilted pipe and the wall $A^2$ to permit the packing C to be properly tamped down with the usual tools.

It will, I believe, be clear that when the pipe B is secured within the hub, any liquids or the like passing therethrough and thence through the bore *a* of the partition A', are, by reason of the central location of the said partition opening and its beveled wall, guided well into the pipe (not shown) secured in the usual way at the opposite end of the hub. It will also be apparent that drippings from the pipe B through said partition bore *a*, gather on the lip *a'* and fall well within the said pipe secured to the opposite end of the hub. Thus, liquids or the like passing through the union are prevented from coming in contact with and injuring the packing by which the lower pipe and hub are united.

A pipe joint or union made according to my invention as above described, is simple in construction and very durable. The provision for guiding the pipe to its proper position within the hub insures a proper connection even when made by careless or comparatively inexperienced workmen, or when the connection has to be made in a difficult location; and the provision for angular positioning of the pipe, results not only in convenience to the workman but in great saving of labor and expense incident to the use of elbows or other curved piping.

I claim:

1. A pipe union comprising a hub having a partition dividing it into two parts, said partition having a central bore provided with a beveled wall and a lip.

2. A pipe union comprising a hub having a mouth provided with a beveled wall and a partition dividing said hub into two parts said partition provided with a central bore having a beveled wall and a lip, circumferential guide surfaces within said hub for guiding a pipe into position therein, a circumferential groove whereby the pipe may be secured in angular position within said hub, and another circumferential groove adapted to receive a packing interposed between said pipe and said hub and to prevent dislodgment of said packing.

Signed by me at Boston, Massachusetts, this twelfth day of October, 1914.

DAVID CRAIG.

Witnesses:
CHARLES D. WOODBERY,
RICHARD W. HALL.